(12) United States Patent
Li et al.

(10) Patent No.: US 8,521,208 B2
(45) Date of Patent: Aug. 27, 2013

(54) METHODS AND APPARATUS OF TRANSMISSION POWER CONTROL IN THE PRESENCE OF INTERFERENCE

(75) Inventors: Junyi Li, Chester, NJ (US); Xinzhou Wu, Monmouth Junction, NJ (US); Sundar Subramanian, Somerville, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 466 days.

(21) Appl. No.: 12/835,278

(22) Filed: Jul. 13, 2010

(65) Prior Publication Data

US 2012/0015678 A1 Jan. 19, 2012

(51) Int. Cl.
*H04B 7/10* (2006.01)
(52) U.S. Cl.
USPC .......................................... 455/522; 455/13.1
(58) Field of Classification Search
USPC ................... 455/69, 522, 13.4, 11.1, 13.1, 16
See application file for complete search history.

(56) References Cited

U.S. PATENT DOCUMENTS

| 7,636,573 | B2 | 12/2009 | Walton et al. |
|---|---|---|---|
| 2006/0045001 | A1 | 3/2006 | Jalali |
| 2006/0094363 | A1 | 5/2006 | Kang et al. |
| 2007/0224936 | A1 | 9/2007 | Desai |
| 2009/0017861 | A1 | 1/2009 | Wu et al. |
| 2009/0042593 | A1 * | 2/2009 | Yavuz et al. .................. 455/522 |
| 2010/0203917 | A1 * | 8/2010 | Yang et al. .................... 455/522 |
| 2011/0176497 | A1 * | 7/2011 | Gopalakrishnan ............ 370/329 |

FOREIGN PATENT DOCUMENTS

| EP | 2045930 A1 | 4/2009 |
|---|---|---|
| WO | 2009009547 A2 | 1/2009 |

OTHER PUBLICATIONS

Pekka Janis and Visa Koivunen et al., "Interference-aware resource allocation for device-to-device radio underlaying cellular networks", Vehicular Technology Conference, VTC Spring 2009. IEEE 69th, Apr. 2009, pp. 1-5.
International Search Report and Written Opinion—PCT/US2011/043900—ISA/EPO—Nov. 30, 2011.
Qualcomm Europe, "UL Interference Control in the Absence of X2 for Rel 9", 3GPP Draft, R1-091442 ICIC With No X2, 3rd Generation Partnership Project (3GPP), Mobile Competence Centre, 650, Route Des Lucioles, F-06921 Sophia- Antipolis Cedex, France, No. Seoul, Korea, Mar. 18, 2009, XP050339016.

\* cited by examiner

*Primary Examiner* — Tu X Nguyen
(74) *Attorney, Agent, or Firm* — James K. O'Hare

(57) ABSTRACT

A method of operating a wireless device is provided in which an interference level on a resource is determined. In addition, a signal is transmitted on the resource with a first power when the interference level is low. The first power is such that the signal is received with a first SNR. Furthermore, the signal is transmitted on the resource with a second power when the interference level is high. The second power is such that the signal is received with a second SNR less than the first SNR.

44 Claims, 11 Drawing Sheets

METHODS AND APPARATUS OF TRANSMISSION POWER CONTROL IN THE PRESENCE OF INTERFERENCE

BACKGROUND

1. Field

The present disclosure relates generally to communication systems, and more particularly, to transmission power control in the presence of interference.

2. Background

In a time-slotted synchronous communication system such as FlashLinQ, the transmission power of the links can typically be either fixed or determined based on the link length. That is, the transmission power may be fixed at a maximum transmit power allowed by the device power amplifier. Alternatively, the transmission power may be based on the link length in order to compensate for the pathloss and achieve a better signal to noise ratio (SNR) at the receiver. In such a configuration, in a high interference environment, the transmission power may be increased to as much as the maximum transmit power in order to achieve a requisite SNR. However, in a high interference environment, increasing the transmission power to a maximum transmit power may degrade system performance. As such, there is a need for methods and an apparatus for transmission power control in the presence of interference that improves system performance.

SUMMARY

In an aspect of the disclosure, a method of operating a wireless device is provided in which an interference level on a resource is determined. In addition, a signal is transmitted on the resource with a first power when the interference level is low. The first power is such that the signal is received with a first SNR. Furthermore, the signal is transmitted on the resource with a second power when the interference level is high. The second power is such that the signal is received with a second SNR less than the first SNR.

In an aspect of the disclosure, an apparatus for wireless communication includes means for determining an interference level on a resource. In addition, the apparatus includes means for transmitting a signal on the resource with a first power when the interference level is low. The first power is such that the signal is received with a first SNR. Furthermore, the apparatus includes means for transmitting the signal on the resource with a second power when the interference level is high. The second power is such that the signal is received with a second SNR less than the first SNR.

In an aspect of the disclosure, a computer program product in a wireless device includes a computer-readable medium. The computer-readable medium includes code for determining an interference level on a resource. In addition, the computer-readable medium includes code for transmitting a signal on the resource with a first power when the interference level is low. The first power is such that the signal is received with a first SNR. Furthermore, the computer-readable medium includes code for transmitting the signal on the resource with a second power when the interference level is high. The second power is such that the signal is received with a second SNR less than the first SNR.

In an aspect of the disclosure, an apparatus for wireless communication includes a processing system. The processing system is configured to determine an interference level on a resource. In addition, the processing system is configured to transmit a signal on the resource with a first power when the interference level is low. The first power is such that the signal is received with a first SNR. Furthermore, the processing system is configured to transmit the signal on the resource with a second power when the interference level is high. The second power is such that the signal is received with a second SNR less than the first SNR.

BRIEF DESCRIPTION OF THE DRAWINGS

FIG. 12 is a conceptual block diagram illustrating the functionality of an exemplary apparatus.

DETAILED DESCRIPTION

Figure 1:
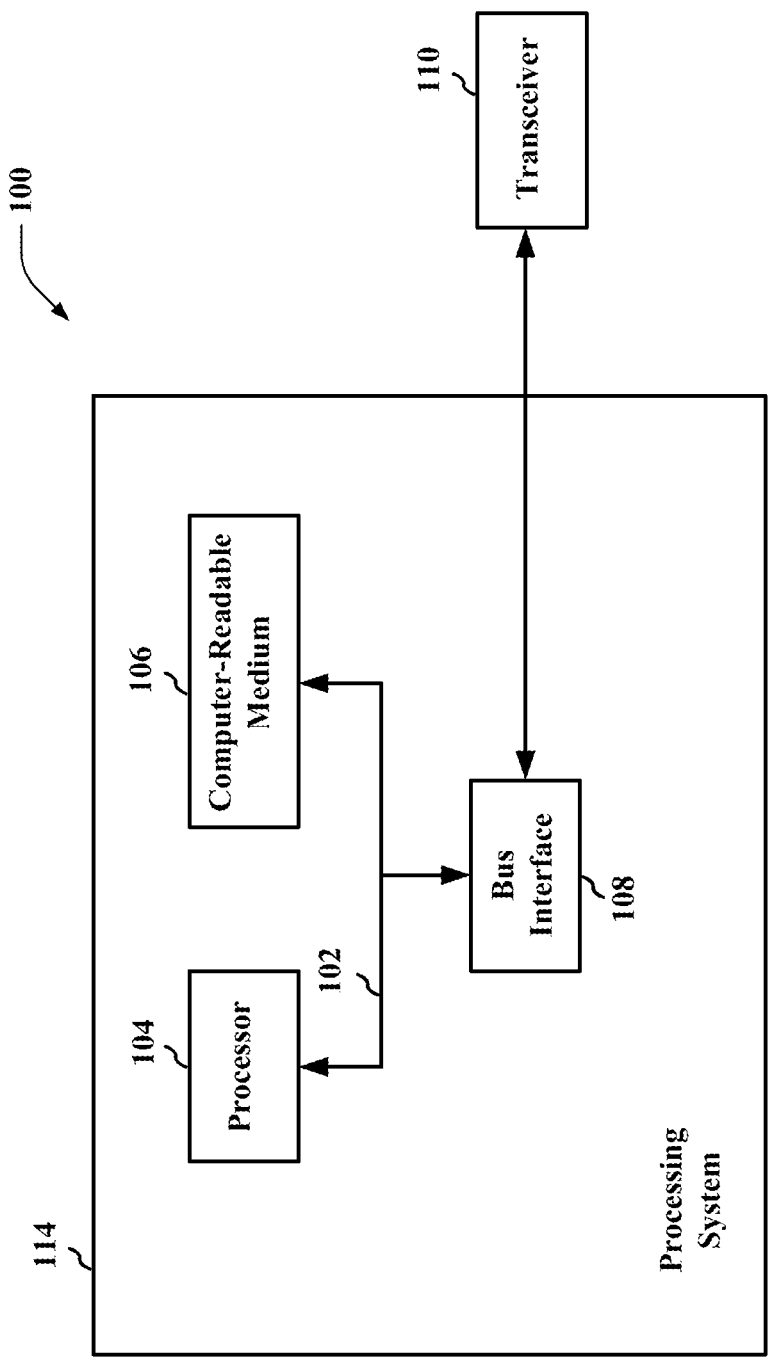
FIG. 1 is a diagram illustrating an example of a hardware implementation for an apparatus employing a processing system.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of communication systems will now be presented with reference to various apparatus and methods. These apparatus and methods will be described in the following detailed description and illustrated in the accompanying drawing by various blocks, modules, components, circuits, steps, processes, algorithms, etc. (collectively referred to as "elements"). These elements may be implemented using electronic hardware, computer software, or any combination thereof Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. A computer-readable medium may include, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, a carrier wave, a transmission line, and any other suitable medium for storing or transmitting software. The computer-readable medium may be resident in the processing system, external to the processing system, or distributed across multiple entities including the processing system. Computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

FIG. 1 is a conceptual diagram illustrating an example of a hardware implementation for an apparatus 100 employing a processing system 114. The apparatus 100 may be referred to by those skilled in the art as user equipment, a mobile station, a subscriber station, a mobile unit, a subscriber unit, a wireless unit, a wireless node, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. The processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatuses over a transmission medium.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

Figure 2:
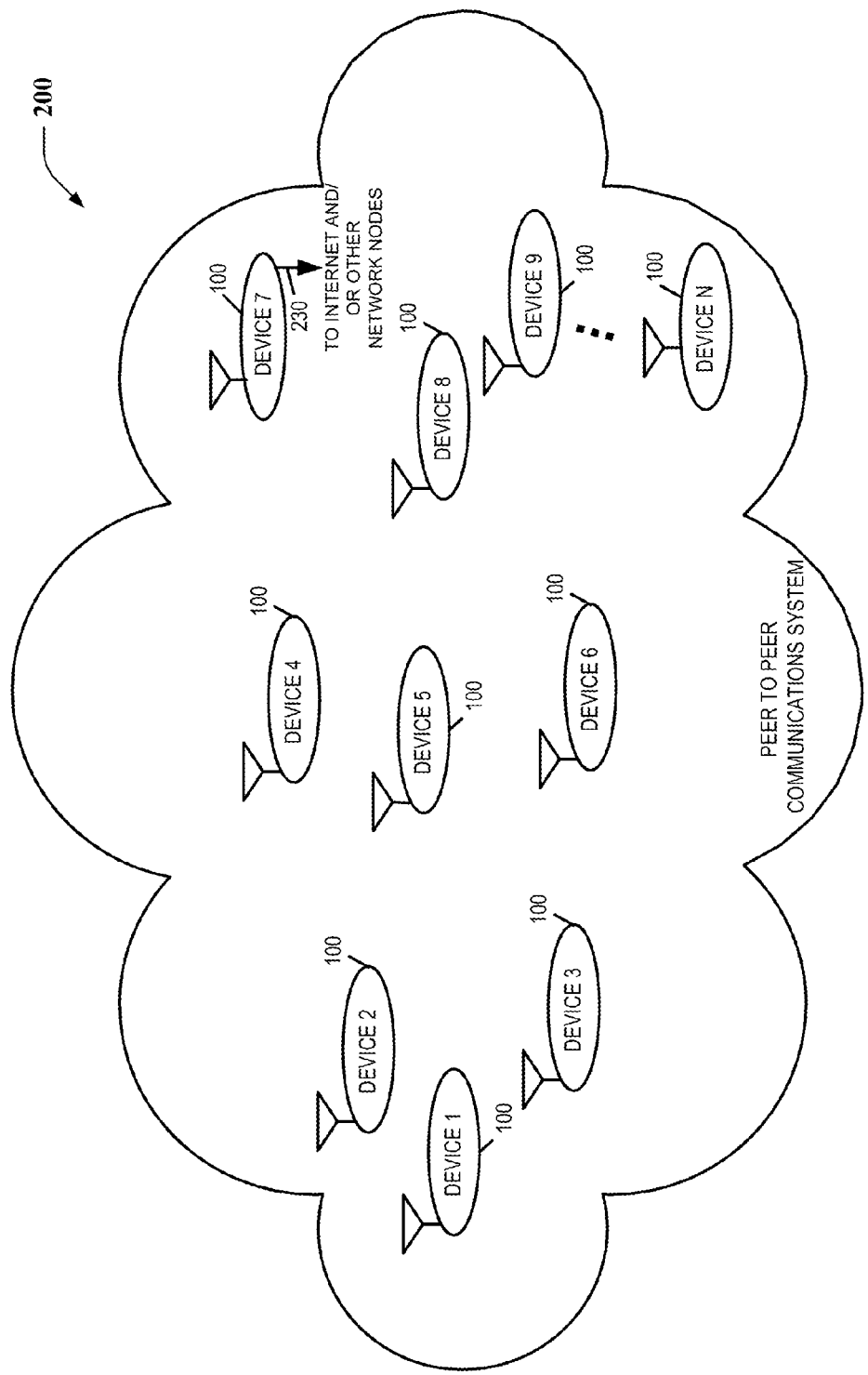
FIG. 2 is a drawing of an exemplary wireless peer-to-peer communications system.

FIG. 2 is a drawing of an exemplary wireless peer-to-peer communications system 200. The wireless peer-to-peer communications system 200 includes a plurality of wireless communications devices 100. Some of the wireless communications devices 100, such as device 7, for example, include an interface 230, to the Internet and/or other network nodes. Some of the wireless communications devices 100 may be mobile wireless communication devices such as handheld mobile devices. The wireless communications devices 100 support direct peer-to-peer communications.

The exemplary methods and apparatuses discussed infra are applicable to any of a variety of wireless peer-to-peer communications systems, such as for example, a wireless peer-to-peer communication system based on FlashLinQ, WiMedia, Bluetooth, ZigBee, or Wi-Fi based on the IEEE 802.11 standard. To simplify the discussion, the exemplary methods and apparatus are discussed within the context of FlashLinQ in relation to FIGS. 3, 4, 5, 6A, and 6B. However, one of ordinary skill in the art would understand that the exemplary methods and apparatuses are applicable more generally to a variety of other wireless peer-to-peer communication systems.

Figure 3:
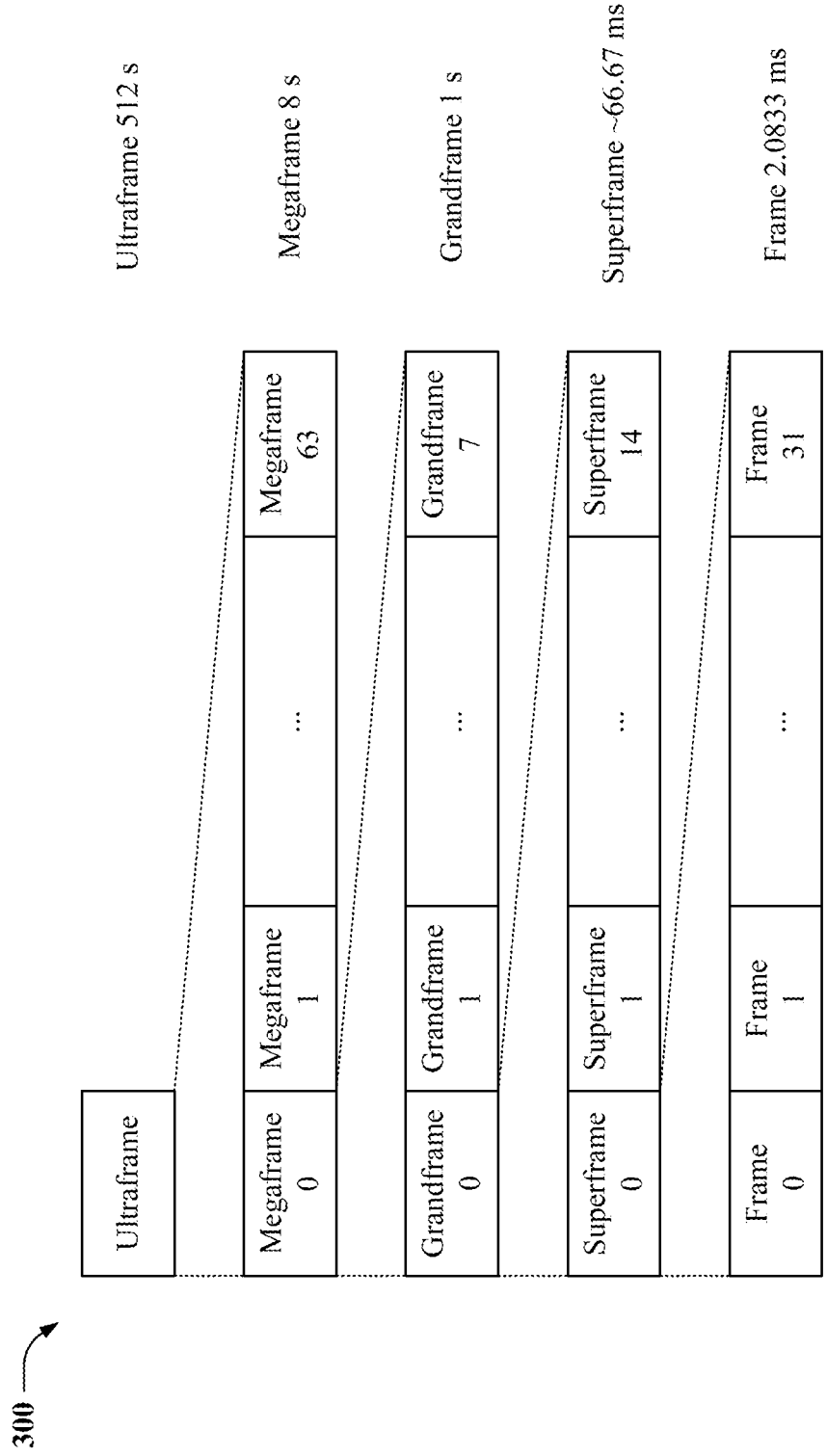
FIG. 3 is a diagram illustrating a time structure for peer-to-peer communications between the wireless communication devices.

FIG. 3 is a diagram 300 illustrating a time structure for peer-to-peer communications between the wireless communication devices 100. An ultraframe is 512 seconds and includes 64 megaframes. Each megaframe is 8 seconds and includes 8 grandframes. Each grandframe is 1 second and includes 15 superframes. Each superframe is approximately 66.67 ms and includes 32 frames. Each frame is 2.0833 ms.

Figure 4:
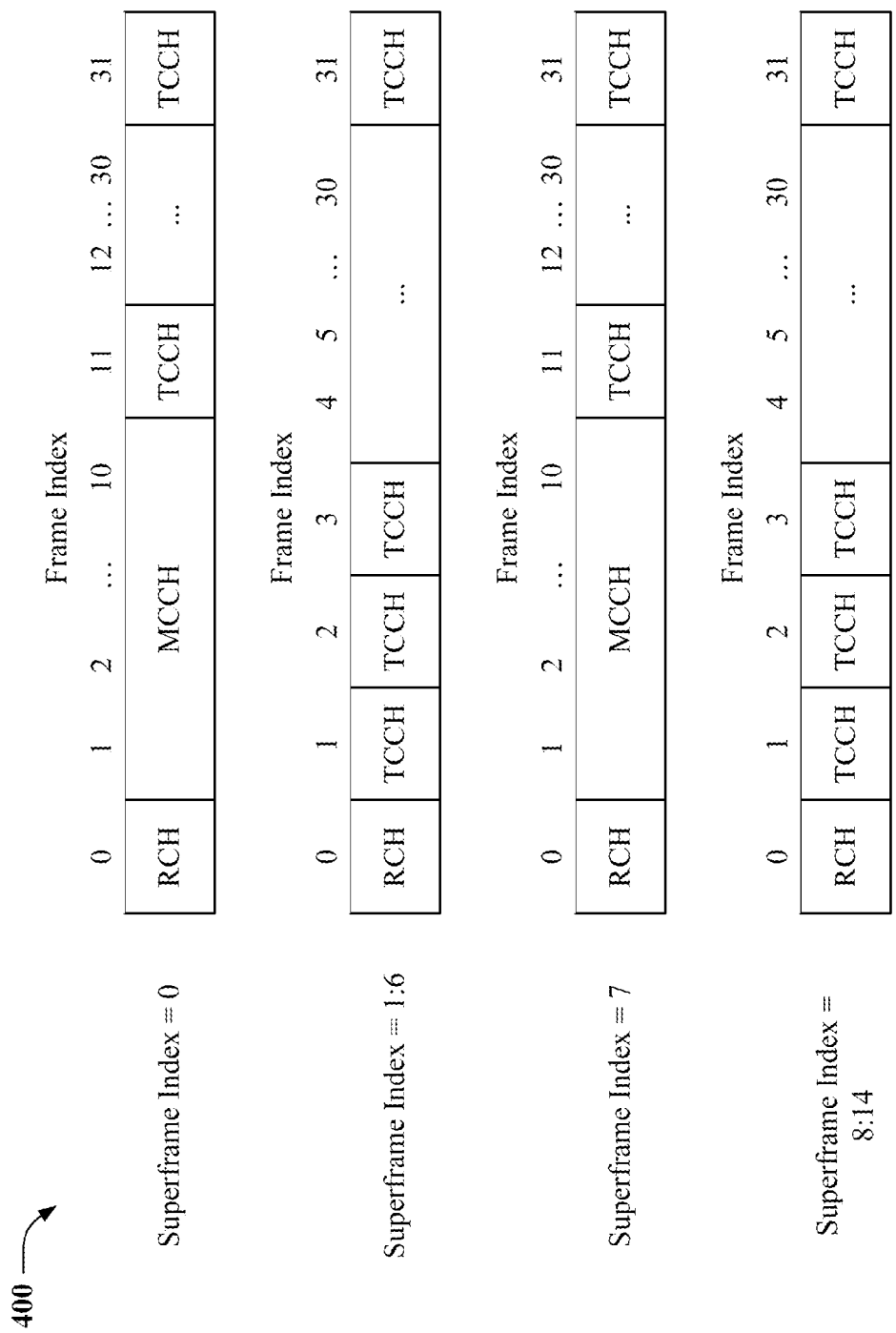
FIG. 4 is a diagram illustrating the channels in each frame of superframes in one grandframe.

FIG. 4 is a diagram 400 illustrating the channels in each frame of superframes in one grandframe. In a first superframe (with index 0), frame 0 is a reserved channel (RCH), frames 1-10 are each a miscellaneous channel (MCCH), and frames 11-31 are each a traffic channel (TCCH). In the $2^{nd}$ through $7^{th}$ superframes (with index 1:6), frame 0 is a RCH and frames 1-31 are each a TCCH. In an $8^{th}$ superframe (with index 7), frame 0 is a RCH, frames 1-10 are each a MCCH, and frames 11-31 are each a TCCH. In the $9^{th}$ through $15^{th}$ superframes (with index 8:14), frame 0 is a RCH and frames 1-31 are each a TCCH. The MCCH of superframe index 0 includes a secondary timing synchronization channel, a peer discovery channel, a peer page channel, and a reserved slot. The MCCH of superframe index 7 includes a peer page channel and reserved slots. The TCCH includes connection scheduling, a pilot, channel quality indicator (CQI) feedback, a data segment, and an acknowledgement (ACK).

Figure 5:
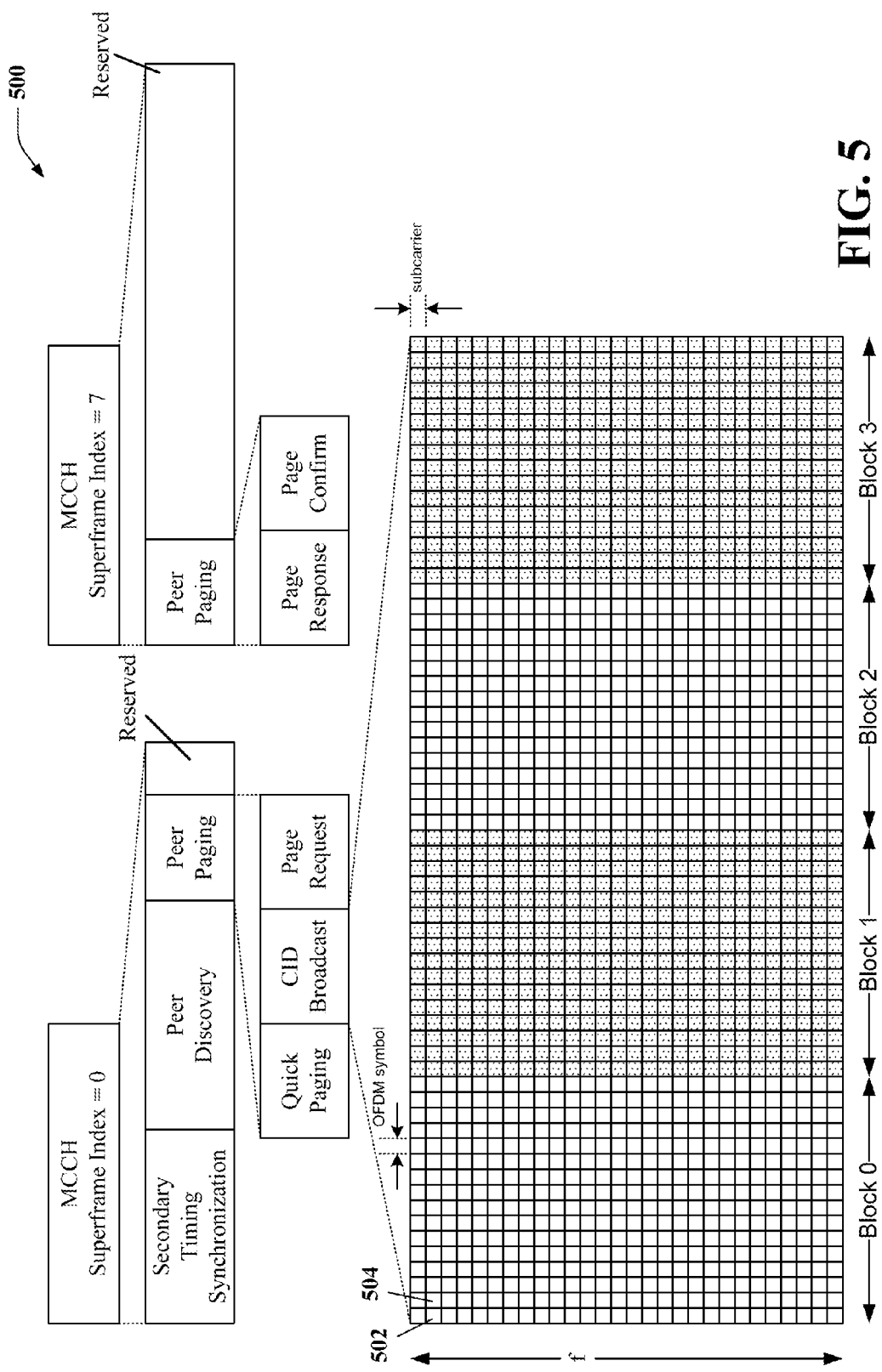
FIG. 5 is a diagram illustrating an operation timeline of a miscellaneous channel and a structure of a cell identifier broadcast.

FIG. 5 is a diagram 500 illustrating an operation timeline of the MCCH and a structure of a cell identifier (CID) broadcast. As discussed in relation to FIG. 4, the MCCH of superframe index 0 includes a secondary timing synchronization channel, a peer discovery channel, a peer paging channel, and a reserved slot. The peer paging channel in the MCCH of superframe index 0 includes a quick paging channel, a CID broadcast channel, and a page request channel. The MCCH of superframe index 7 includes a peer paging channel and a reserved slot. The peer paging channel in the MCCH of superframe index 7 includes a page response channel and a page confirm channel. The CID broadcast channel provides a distributed protocol for CID allocations for new connections, provides a mechanism for CID collision detection, and provides a wireless node evidence that its link connection with a communication peer still exists.

The structure of the CID broadcast consists of four blocks, each of which contains a plurality of resource elements, i.e., a plurality of subcarriers in the frequency domain and orthogonal frequency divisional multiplexing (OFDM) symbols in the time domain. Each of the four blocks spans a plurality of subcarriers (e.g., 28 subcarriers) and includes 16 OFDM symbols. One resource element (or tone) corresponds to one subcarrier and one OFDM symbol.

For each CID, a pair of resource elements in adjacent OFDM symbols is allocated in each of the four blocks for the CID broadcast. In a pair of adjacent resource elements, a first resource element carries an energy proportional to a power used to transmit in the TCCH and a second resource element carries an energy inversely proportional to a power received in the TCCH. For a given CID, each pair of resource elements has a fixed OFDM symbol position and a varying subcarrier within the block that varies each grandframe. In any given link, the wireless node that initiated the link randomly selects a block from Block 0 and Block 2 for the CID broadcast and the other wireless node in the link randomly selects a block from Block 1 and Block 3 for the CID broadcast. As such, for a particular CID, only half of the allocated resources are utilized by a link with that CID. Due to the random selection of a block, a first wireless node in a link with a second wireless node will be able to detect a CID collision when a third wireless node or a fourth wireless node in a different link transmits a CID broadcast using a block different than the block selected by the first wireless node or the second wireless node.

For example, assume a wireless node with a CID=4 selects Block 0 for the CID broadcast. The wireless node may be allocated resource elements 502, 504 for the CID broadcast. In resource element 502, the wireless node transmits an energy proportional to a power used to transmit in the TCCH. In resource element 504, the wireless node transmits an energy inversely proportional to a power received in the TCCH. In a subsequent grandframe, the wireless node may have a different pair of resource elements with a different subcarrier, but the same relative OFDM symbol position (i.e., in this example, the first and the second OFDM symbol of the selected block).

Figure 6:
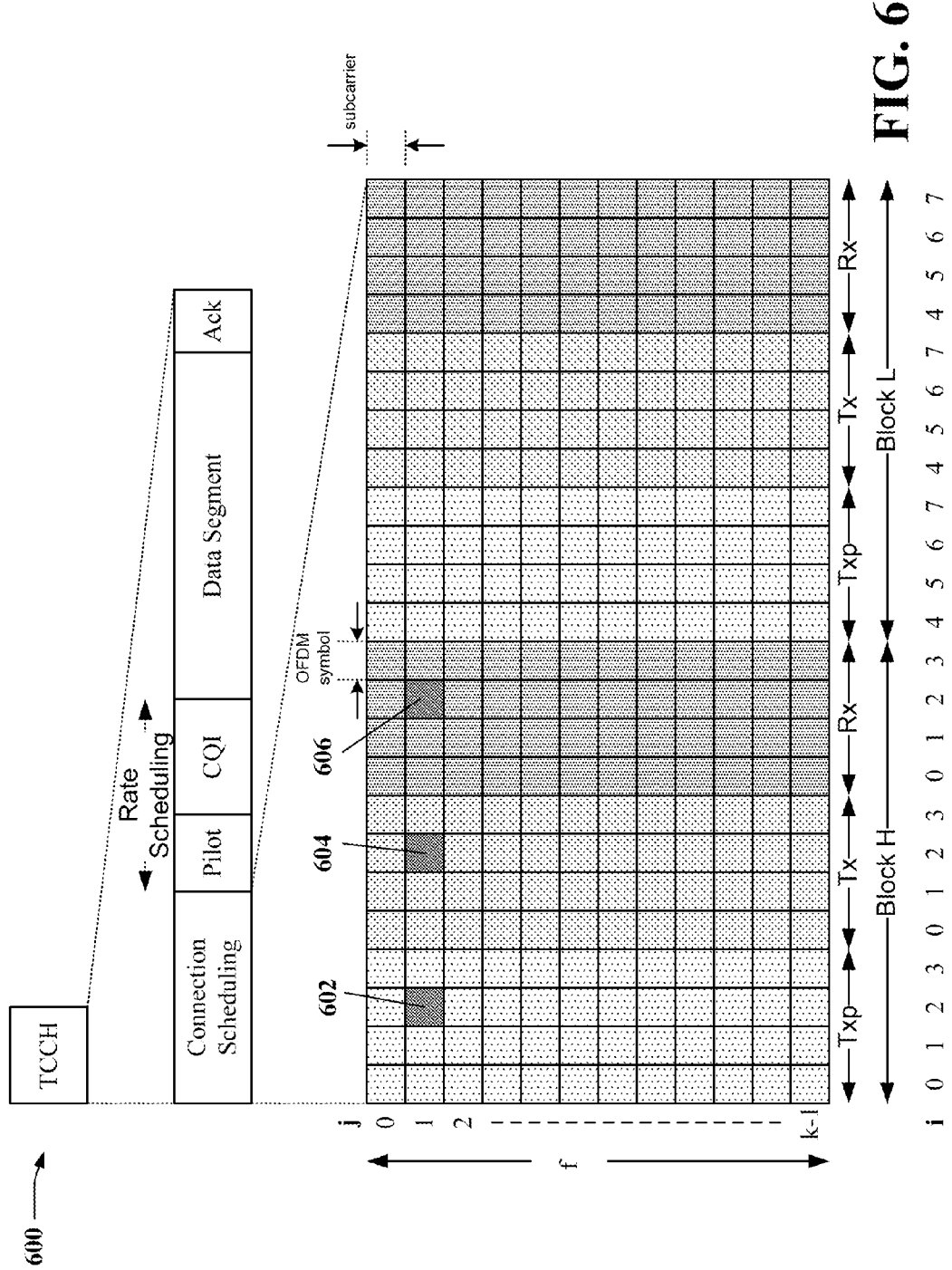
FIG. 6 is a diagram illustrating an operation timeline of a traffic channel slot and a structure of connection scheduling.

FIG. 6 is a diagram 600 illustrating an operation timeline of a TCCH slot and a structure of connection scheduling. As shown in FIG. 6, a TCCH slot includes four subchannels: connection scheduling, rate scheduling, data segment, and ACK. The rate scheduling subchannel includes a pilot segment and a CQI segment. The ACK subchannel is for transmitting a hybrid automatic repeat request (HARD) acknowledgment (ACK) or negative acknowledgement (NACK) in response to data received in the data segment subchannel. The connection scheduling subchannel includes two blocks, a higher priority Block H and a lower priority Block L. Each of Block H and Block L contains a plurality of resource elements, i.e., a plurality of subcarriers in the frequency domain and OFDM symbols in the time domain. Each of Block H and Block L spans the plurality of subcarriers and includes four OFDM symbols in a Txp-block, four OFDM symbols in a Tx-block, and four OFDM symbols in an Rx-block. One resource element (or tone) corresponds to one subcarrier and one OFDM symbol.

Each link has a CID. Based on the CID, for a particular TCCH slot, wireless nodes in a link are allocated a resource element in the same respective OFDM symbol position in each of the Txp-block, the Tx-block, and the Rx-block at a particular subcarrier and within Block H or Block L. For example, in a particular TCCH slot, a link with CID=4 may be allocated the resource element 602 in the Txp-block of Block H, the resource element 604 in the Tx-block of Block H, and the resource element 606 in the Rx-block of Block H for transmitting/receiving a scheduling control signal. A transmit request signal in the Tx-block is transmitted with a power equal to a power for transmitting the data segment. A transmit request response signal in the Rx-block is transmitted with a power proportional to an inverse of the power of the received transmit request signal. The allocated trio of resource elements for the Txp-block, Tx-block, and Rx-block vary with respect to the subcarrier (e.g., k different subcarriers) and the respective OFDM symbol in each TCCH slot (e.g., 8 different OFDM symbols—4 in the Block H and 4 in the Block L).

The trio of resource elements allocated to a link dictates the medium access priority of the link. For example, the trio of resource elements 602, 604, 606 corresponds to i=2 and j=1. The medium access priority is equal to ki+j+1, where i is the respective OFDM symbol in each of the Txp, Tx, and Rx subblocks, j is the subcarrier, and k is the number of subcarriers. Accordingly, assuming k=28, the resource elements 602, 604, 606 correspond to a medium access priority of 58.

Figure 7:
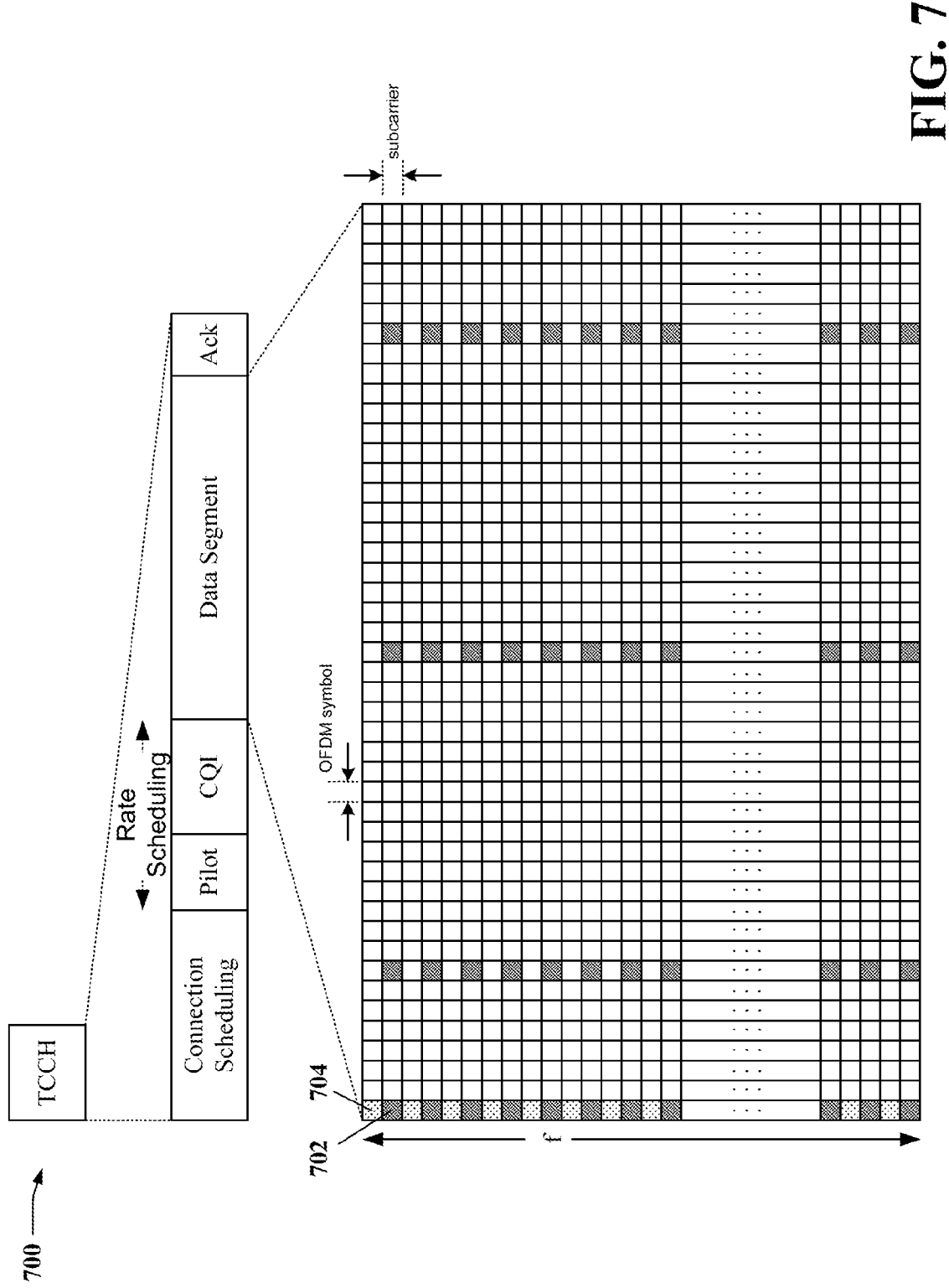
FIG. 7 is a diagram illustrating a structure of a data segment.

FIG. 7 is a diagram 700 illustrating a structure of the data segment. The data segment contains a plurality of resource elements spanning a plurality of subcarriers in the frequency domain and OFDM symbols in the time domain. Some of the resource elements in the data segment, such as resource element 704, may carry rate indicator information regarding the coding and/or modulation used for the data segment. Other resource elements in the data segment, such as resource element 702, may carry a pilot to allow for estimating the channel for demodulation and decoding.

Figure 8B:
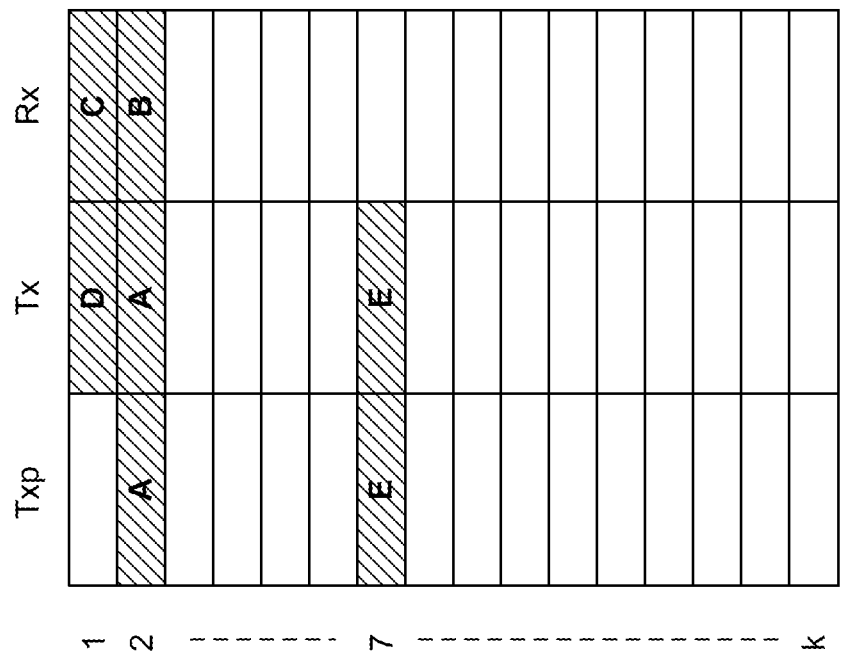
FIG. 8B is a second diagram for illustrating an exemplary connection scheduling signaling scheme for the wireless communications devices.
Figure 8A:
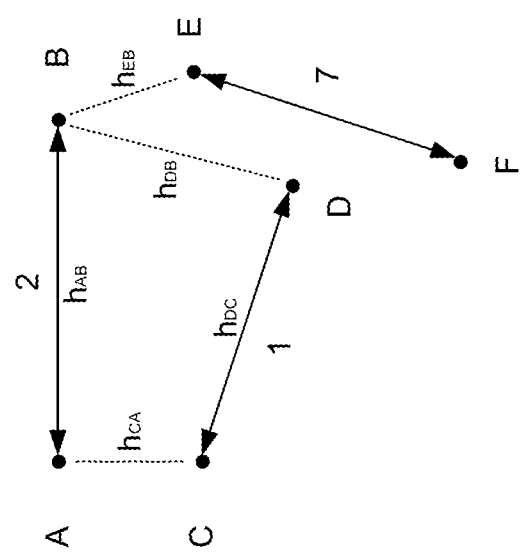
FIG. 8A is a first diagram for illustrating an exemplary connection scheduling signaling scheme for the wireless communications devices.

FIG. 8A is a first diagram for illustrating an exemplary connection scheduling signaling scheme for the wireless communications devices 100. As shown in FIG. 8A, wireless node A is communicating with wireless node B, wireless node C is communicating with wireless node D, and wireless node E is communicating with wireless node F. The wireless node A is assumed to have transmit priority over the wireless node B, the wireless node C is assumed to have transmit priority over the wireless node D, and the wireless node E is assumed to have transmit priority over the wireless node F. Each of the links has a different medium access priority depending on the particular slot for communication. For the particular slot for communication, link 1 (A, B) is assumed to have a medium access priority of 2, link 2 (C, D) is assumed to have a medium access priority of 1, and link 3 (E, F) is assumed to have a medium access priority of 7.

FIG. 8B is a second diagram for illustrating an exemplary connection scheduling signaling scheme for the wireless communications devices 100. FIG. 8B shows connection scheduling resources of first respective OFDM symbols (i=0, see FIG. 6) of Txp, Tx, and Rx subblocks in Block H (corresponding to medium access priorities 1 through k) in the connection scheduling subchannel. The connection scheduling resources include a plurality of subcarriers, each of the subcarriers corresponding to one of k frequency bands. Each of the frequency bands corresponds to a particular medium access priority. One block in the connection scheduling resources is split into three subblocks/phases: Txp, Tx, and Rx. The Txp-block is used by the node with transmit priority in the link to indicate whether the node with transmit priority will act as a transmitter or a receiver. If the node with transmit priority transmits on the allocated OFDM symbol in the Txp-block, the node with transmit priority indicates to the node without transmit priority an intent to act as a transmitter. If the node with transmit priority does not transmit on the allocated OFDM symbol in the Txp-block, the node with transmit priority indicates to the node without transmit priority an intent to act as a receiver. The Tx-block is used by potential transmitters to make a request to be scheduled. The transmitter transmits a direct power signal on the allocated OFDM symbol in the Tx-block at a power equal to a power used for the traffic channel (i.e., a power for transmitting the data segment). Each potential receiver listens to the tones in the Tx-blocks, compares the received power on each of the Tx-blocks to the received power on the Tx-block allocated to the transmitter of its own link, and determines whether to Rx-yield based on its own link medium access priority relative to other link medium access priorities and the comparison.

For example, assume the nodes A, D, and E transmit a transmit request signal in the Tx-block at a power equal to $P_A$, $P_D$, and $P_E$, respectively. The node B receives the transmit request signal from the node A at a power equal to $P_A|h_{AB}|^2$, where $h_{AB}$ is the pathloss between the node A and the node B. The node B receives the transmit request signal from the node D with a power equal to $P_D|h_{DB}|^2$, where $h_{DB}$ is the pathloss between the node D and the node B. The node B receives the transmit request signal from the node E with a power equal to $P_E|h_{EB}|^2$, where $h_{EB}$ is the pathloss between the node E and the node B. The node B compares the power of the received transmit request signal from the node A divided by the sum of the powers of the received transmit request signals from other nodes with a higher priority to a threshold in order to determine whether to Rx-yield. The node B does not Rx-yield if the node B expects a reasonable signal to interference ratio (SIR) if scheduled. That is, the node B Rx-yields unless $P_A|h_{AB}|^2/P_D|h_{DB}|^2 > \gamma_{RX}$, where $\gamma_{RX}$ is the threshold (e.g., 9 dB).

The Rx-block is used by the potential receivers. If the receiver chooses to Rx-yield, the receiver does not transmit in the allocated OFDM symbol in the Rx-block; otherwise, the receiver transmits an inverse echo power signal in the allocated OFDM symbol in the Rx-block at a power proportional to an inverse of the power of the received direct power signal from the transmitter of its own link. All of the transmitters listen to the tones in the Rx-block to determine whether to Tx-yield transmission of the data segment.

For example, the node C, having received the transmit request signal from the node D at a power equal to $P_D|h_{DC}|^2$, transmits a transmit request response signal in the Rx-block at a power equal to $K/P_D|h_{DC}|^2$, where $h_{DC}$ is the pathloss between the node D and the node C, and K is a constant known to all nodes. The node A receives the transmit request response signal from the node C at a power equal to $K|h_{CA}|^2/P_D|h_{DC}|^2$, where $h_{CA}$ is the pathloss between the node C and the node A. The node A Tx-yields if the node A would cause too much interference to the node C. That is, the node A Tx-yields unless $P_D|h_{DC}|^2/P_A|h_{CA}|^2 > \gamma_{TX}$, where $\gamma_{TX}$ is a threshold (e.g., 9 dB).

The connection scheduling signaling scheme is best described in conjunction with an example. The node C has no data to transmit and does not transmit in the Txp-block for medium access priority 1, the node A has data to transmit and transmits in the Txp-block for medium access priority 2, and the node E has data to transmit and transmits in the Txp-block for medium access priority 7. The node D has data to transmit and transmits in the Tx-block for medium access priority 1, the node A transmits in the Tx-block for medium access priority 2, and the node E transmits in the Tx-block for medium access priority 7. The node C listens to the tones in the Tx-blocks and determines to transmit in the Rx-block for medium access priority 1, as the node C has the highest priority. The node B listens to the tones in the Tx-blocks, determines that its link would not interfere with link 2, which has a higher medium access priority, and transmits in the Rx-block for medium access priority 2. The node F listens to the tones in the Tx-blocks, determines that its link would interfere with link 1 and/or link 2, both of which have a higher medium access priority, and Rx-yields by not transmitting in the Rx-block for medium access priority 7. Subsequently, both D and A listen to the tones in the Rx blocks to determine whether to transmit the data. Because D has a higher link medium access priority than A, D transmits its data. A will Tx-yield transmission of the data if A determines that its transmission would interfere with the transmission from D.

Referring again to FIG. 7, in FlashLinQ, the transmit power for transmitting the data segment is scaled based on a fixed/maximum power and a power that is required to achieve a constant SNR. The scaled power increases up to the fixed/maximum power with increasing distance. In a heterogeneous network where both long links (links with an SNR less than a threshold) and short links (all other links) coexist, scaling the transmit power encourages short links to use less power to avoid generating unnecessary interference to the long links.

Given the finite power range at the transmitter, targeting a high SNR may not be satisfiable or possible, but reducing the target SNR uniformly over the whole network may limit the maximum rate for links that are shorter because for shorter links there may be sufficient power to achieve a higher SNR. In modern communication systems, usually the highest rate option is chosen to be able to support an SNR of greater than 25 dB. The transmit power may be selected such that the received SNR is greater than 30 dB. However, for long links, the transmit power will likely be limited to the maximum power cap and the actual received SNR will be bounded away from 30 dB. In other words, the links which are longer than a certain threshold (e.g., ~60 meters) will all transmit at maximum power and the system won't be able to differentiate links which are longer than this threshold.

For example, two links with length 1 mile and 60 meters, respectively, may both transmit at full power, which is a clear violation of the transmit power scaling concept mentioned supra. In the presence of other links, the signal to interference plus noise ratio (SINR) achievable by links is also dependent on the connection scheduling algorithm. If the connection scheduling algorithm guarantees only a specific level of interference protection, increasing the target SNR beyond this ratio may be futile because the overall interference in the network may ultimately be increased without increasing the rate.

Figure 9B:
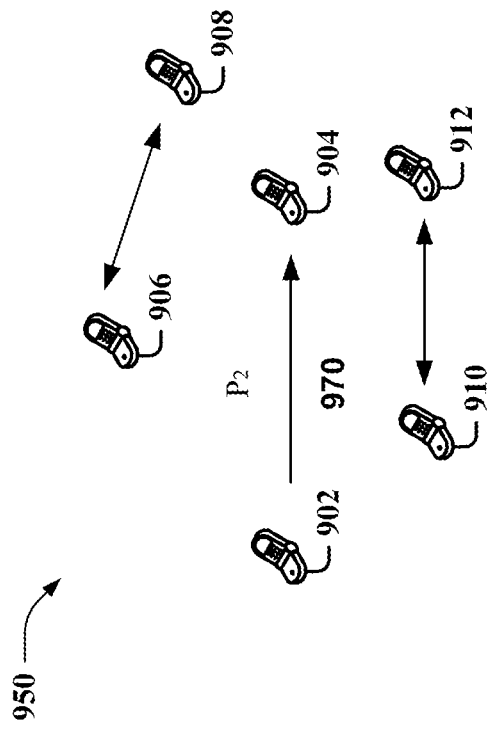
FIG. 9B is another diagram for illustrating an exemplary method for controlling the transmission power.
Figure 9A:
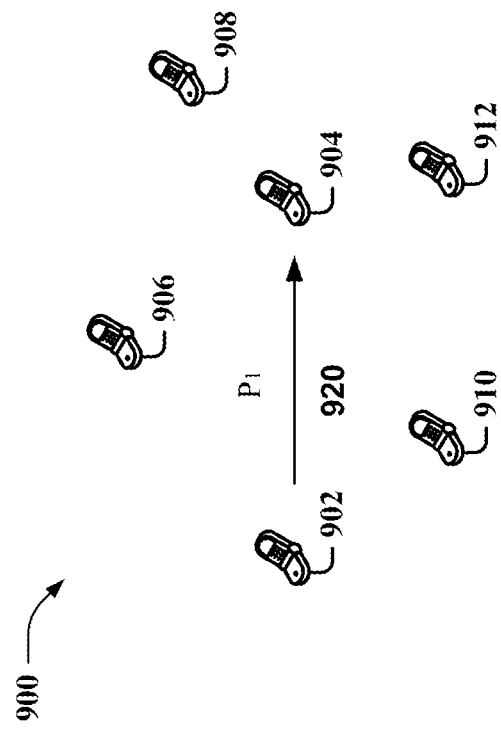
FIG. 9A is a diagram for illustrating an exemplary method for controlling the transmission power.

FIG. 9A is a diagram 900 and FIG. 9B is a diagram 950 for illustrating an exemplary method for controlling the transmission power. As shown in FIG. 9A, wireless node 902 and wireless node 904 are in peer-to-peer communication. The other wireless nodes 906, 908, 910, 912 are not in peer-to-peer communication and are therefore not causing any interference to the link 902, 904. The wireless node 902 determines an interference level on the resource. In this case, the interference level is low, as there are no other links causing interference. In such a configuration, the wireless node 902 transmits a signal 920 on the resource with a first power $P_1$. The first power $P_1$ is such that the signal 920 is received with a first SNR (e.g., 30 db or an SNR required by a highest rate codebook implemented in the wireless device). As discussed supra, the signal 920 may be the data segment. As shown in FIG. 9B, the wireless node 906 and the wireless node 908 are in peer-to-peer communication and the wireless node 910 and the wireless node 912 are in peer-to-peer communication. In this case, the interference level may be high if the link 906, 908 and/or the link 910, 912 causes a sufficiently high interference to the link 902, 904. In such a configuration, the wireless node 902 transmits the signal 970 on the resource with a second power $P_2$. The second power $P_2$ is such that the signal is received with a second SNR (e.g., 10 dB) less than the first SNR (e.g., 30 db). As such, the wireless node 902 lowers the transmission power rather than raises the transmission power when the wireless node 902 encounters interference.

Setting 30 dB as the targeted SNR maximizes the peak rate in the system, but sacrifices the overall system efficiency in a congested deployment due to inappropriate spatial reuse. Setting 10 dB as the targeted SNR enables good spatial reuse, but sacrifices the peak rate for short links when the short links are operating alone. The exemplary method proposes adaptively switching between at least two different transmit power settings based on the observation of the current deployment situation. Specifically, the wireless node 902 may use a higher transmit power when no other links are detected around a given link and switch to a smaller transmit power when interference is detected. The smaller transmit power may have a range of values based on a target SNR.

Specifically, the wireless node 902 may initially use a transmit power that is a function of a higher target SNR. On detecting other links with which the wireless node 902 may have to share the wireless resource, the wireless node 902 may use a transmit power that is a function of a lower target SNR. The wireless node 902 may switch back to a transmit power that is a function of a higher target SNR when neighboring links disappear. The lower target SNR may vary depending on an estimated and/or detected interference.

The wireless node 902 may determine the interference level through detecting whether other links are communicating on the resource. For example, the wireless node 902 may determine that other links are communicating on the resource based on broadcasts in the connection scheduling channel. The wireless node 902 may transmit the signal 920 with the first power $P_1$ when no links are present, as shown in FIG. 9A, and may transmit the signal 970 with the second power $P_2$ less than the first power $P_1$ when links are detected as communicating on the resource, as shown in FIG. 9B.

In one configuration, the wireless node 902 may determine the first power $P_1$ when interference is low and the second power $P_2$ when the interference is high through the following equations: $P_1=\min(P_a,P_{max})$ and $P_2=\min(P_b,P_{max})$, where $P_a$ is the higher target SNR, $P_b$ is the lower target SNR, and $P_a>P_b$.

In one example, $P_a=P_{SNR30}$, i.e., $P_a$ is equal to the power such that the signal 920 would be received by the wireless node 904 at an SNR of 30 dB. In another example, $P_a$ is equal to an SNR required by a highest rate codebook implemented in the wireless device. In one example, $P_b=P_{SNR10}$, i.e., $P_b$ is equal to the power such that the signal 970 would be received by the wireless node 904 at an SNR of 10 dB. In another example, $P_b=P_{ESTIMATED\_SINR}$, i.e., $P_b$ is equal to the power such that the signal 970 would be received by the wireless node 904 at the estimated SINR. In one configuration, $P_b=P_{ESTIMATED\_SINR}$ only if the estimated SINR is greater than or equal to a threshold (e.g., 5 dB) and is equal to the threshold otherwise.

Figure 10:
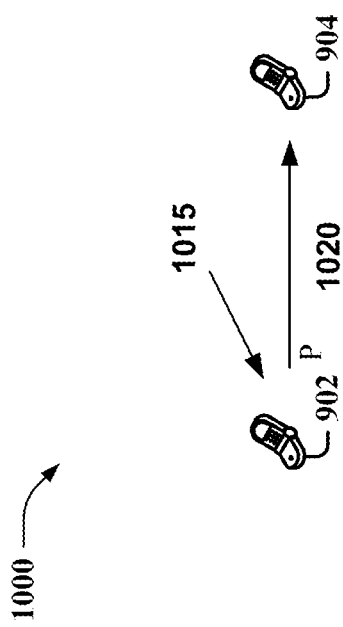
FIG. 10 is yet another diagram for illustrating an exemplary method for controlling the transmission power.

FIG. 10 is a diagram 1000 for illustrating an exemplary method for controlling the transmission power. As discussed supra, the wireless node 902 may estimate the SINR of the signal 1020 received at the wireless node 904 and set a power P of the signal 1020 based on the estimated SINR. In one configuration, the wireless node 902 receives a signal 1015, estimates the SINR of the signal 1020 based on the signal 1015, and sets the power P of the signal 1020 based on the estimated SINR. The signal 1015 may be received from the wireless node 904 and may include information on the SINR. For example, the signal 1015 may include CQI and may be received from the wireless node 904 in the CQI segment of the rate scheduling channel (see FIG. 6). Alternatively, the signal 1015 may include an SINR based on a number of errors of a known data block sent by the wireless node 902 to the wireless node 904. That is, the wireless node 902 may send a known data block to the wireless node 904 and the wireless node 904 may communicate back to the wireless node 902 through the signal 1015 an SINR based on a number of errors in the received data block. From the SINR of the data block, the wireless node 902 can estimate the SINR of the signal 1020 sent in the data segment. In another configuration, the signal 1015 is received from other wireless nodes. For example, the signal 1015 may be one or more scheduling control signals received from other wireless nodes in other links. From the received scheduling control signals, the wireless node 904 can estimate the SINR by summing energies of higher priority links to determine whether to yield. In this latter option for estimating the SINR, the actual SINR may be higher than the estimated SINR due to other links yielding and therefore at least partially participating in the connection scheduling, but not participating in the transmitting of the data segment. In the latter option, the estimated SINR may be adjusted to account for the yielding of other links.

Referring again to FIG. 9B, in one configuration, the second SNR is set to a first value (e.g., 10 dB) when the estimated SINR is determined to be less than a second value (e.g., some value greater than 10 dB). A difference between the first value and the second value may be less than or equal to 3 dB. For example, the first value may be 10 dB and the second value may be 13 dB. In such a configuration, the second SNR is 10 dB whenever the estimated SINR is less than or equal to 13 dB. In another configuration, the second SNR is set to a first value (e.g., 10 dB) when the estimated SINR is determined to be less a threshold (e.g., 1 dB) below an SNR required by a highest rate codebook implemented in the wireless device. In another configuration, the second SNR is set to approximately the SINR. In one example, the second SNR is set to the SINR whenever the SINR is greater than 5 dB and is set to 5 dB otherwise.

Any combination of the above schemes for setting the second SNR is possible. As such, the second power $P_2$ may have a plurality of values depending on the estimated SINR and, possibly, other environmental variables.

Figure 11:
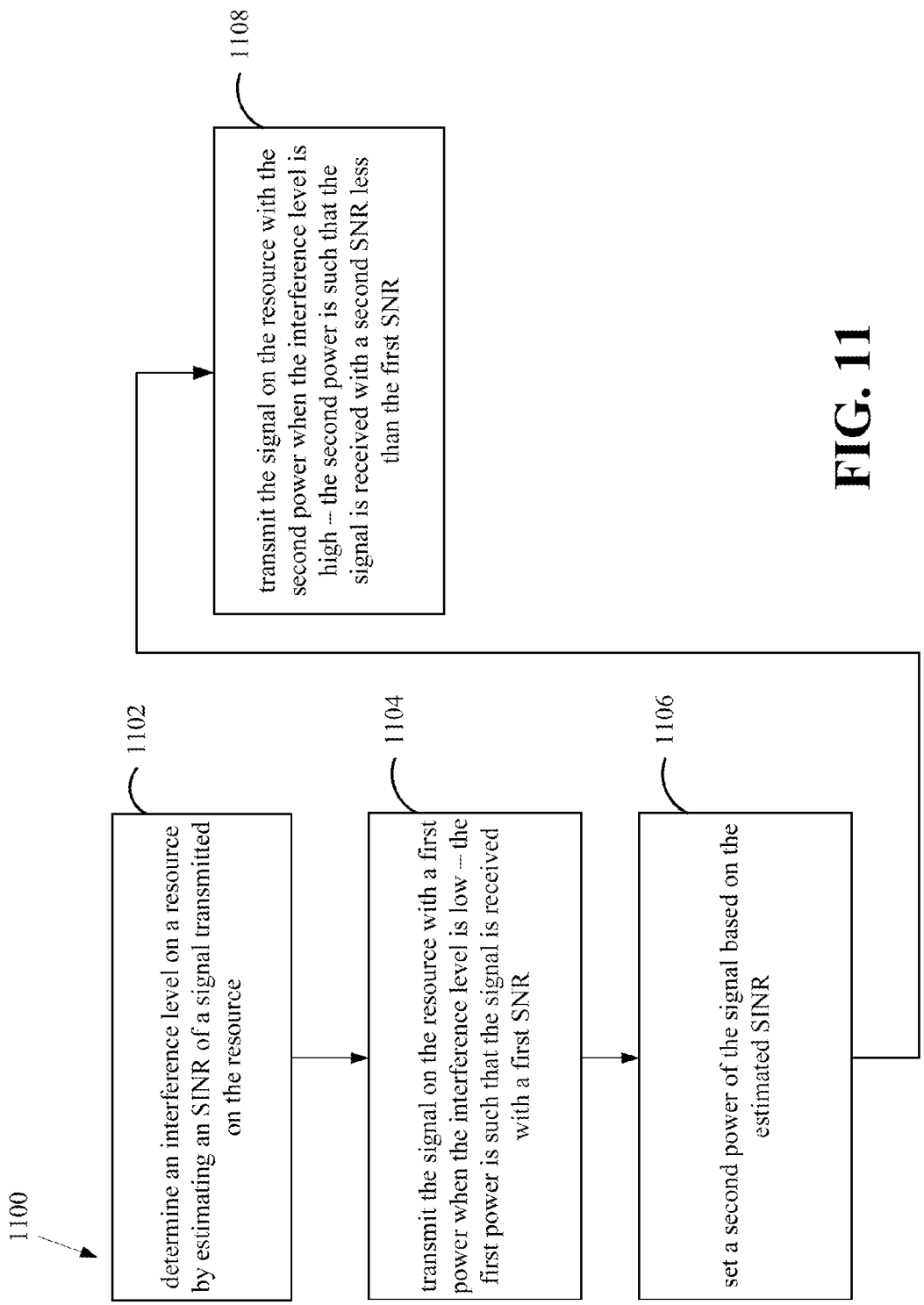
FIG. 11 is a flow chart of a method of wireless communication.

FIG. 11 is a flow chart 1100 of an exemplary method. The method is performed by a wireless device in peer-to-peer communication with a second wireless device. As shown in FIG. 11, the wireless device determines an interference level on a resource (1102). The wireless device may determine the interference by estimating an SINR of a signal transmitted on the resource (1102). In addition, the wireless device transmits the signal on the resource with a first power when the interference level is low (1104). The first power is such that the signal is received with a first SNR (e.g., $P_1=\min(P_a,P_{max})$, where $P_a$ is equal to 30 dB or an SNR required by a highest rate codebook implemented in the wireless device) (1104). Furthermore, the wireless device sets a second power of the signal based on the estimated SINR (1106). The wireless device transmits the signal on the resource with a second power when the interference level is high (1108). The second power is such that the signal is received with a second SNR less than the first SNR (e.g., $P_2\min(P_b,P_{max})$, where $P_b$ is a function of the estimated SINR) (1108).

In one configuration, the wireless device determines the interference level by detecting whether other links are communicating on the resource, the signal is transmitted on the resource with the first power when no links are detected as communicating on the resource, and the signal is transmitted on the resource with the second power when links are detected as communicating on the resource. In one configuration, the wireless device receives a second signal on the resource and estimates the SINR based on the second signal. The second signal may be received from the second wireless device and may include information on the SINR (e.g., CQI or SINR of received data block). The second signal may be received from other wireless devices in other links (e.g., in the connection scheduling), and in such a configuration, the wireless device estimates an energy of the second signal and estimates the SINR based on the estimated energy.

FIG. 12 is a conceptual block diagram 1200 illustrating the functionality of an exemplary apparatus 100. The apparatus 100 includes a module 1202 that determines an interference level on a resource. In addition, the apparatus 100 includes a module 1204 that transmits a signal on the resource with a first power when the interference level is low. The first power is such that the signal is received with a first SNR. Furthermore, the apparatus 100 includes a module 1206 that transmits the signal on the resource with a second power when the interference level is high. The second power is such that the signal is received with a second SNR less than the first SNR.

Referring to FIG. 1, in one configuration, the apparatus 100 for wireless communication includes means for determining an interference level on a resource. In addition, the apparatus 100 includes means for transmitting a signal on the resource with a first power when the interference level is low. The first power is such that the signal is received with a first SNR. Furthermore, the apparatus 100 includes means for transmitting the signal on the resource with a second power when the interference level is high. The second power is such that the signal is received with a second SNR less than the first SNR. In one configuration, the apparatus 100 further includes means for receiving a second signal on the resource, means for estimating an SINR of the signal transmitted to the second wireless device based on the second signal, and means for setting the second power of the signal based on the estimated SINR. In one configuration, the apparatus 100 further includes means for estimating an energy of the second signal. The aforementioned means is the processing system 114 configured to perform the functions recited by the aforementioned means.

It is understood that the specific order or hierarchy of steps in the processes disclosed is an illustration of exemplary approaches. Based upon design preferences, it is understood that the specific order or hierarchy of steps in the processes may be rearranged. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims Moreover, nothing disclosed herein is intended to be dedicated to the public regardless of whether such disclosure is explicitly recited in the claims No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of operating a wireless device, comprising:
   determining an interference level on a resource;
   transmitting a signal on the resource with a first power when the interference level is low, the first power being such that the signal is received with a first signal to noise ratio (SNR); and
   transmitting the signal on the resource with a second power when the interference level is high, the second power being such that the signal is received with a second SNR less than the first SNR.

2. The method of claim 1, wherein the determining the interference level comprises detecting whether other links are communicating on the resource, and wherein the signal is transmitted on the resource with the first power when no links are detected as communicating on the resource, and wherein the signal is transmitted on the resource with the second power when links are detected as communicating on the resource.

3. The method of claim 1, wherein the signal is transmitted to a second wireless device in communication with said wireless device, the method further comprising:
   receiving a second signal on the resource;
   estimating a signal to interference plus noise ratio (SINR) of the signal transmitted to the second wireless device based on the second signal; and
   setting the second power of the signal based on the estimated SINR.

4. The method of claim 3, wherein the second signal is received from the second wireless device and includes information on the SINR.

5. The method of claim 3, further comprising estimating an energy of the second signal, wherein the estimating the SINR is based on the estimated energy.

6. The method of claim 1, wherein the determining the interference level comprises estimating a signal to inference plus noise ratio (SINR) of the transmitted signal.

7. The method of claim 6, wherein the second SNR is set to a first value when the estimated SINR is determined to be less than a second value.

8. The method of claim 7, wherein a difference between the first value and the second value is less than or equal to 3 db.

9. The method of claim 6, wherein the second SNR is set to a first value when the estimated SINR is determined to be less than a threshold below an SNR required by a highest rate codebook implemented in the wireless device.

10. The method of claim 9, wherein the threshold is 1 dB.

11. The method of claim 1, wherein the second SNR is set to approximately the SINR.

12. An apparatus for wireless communication, comprising:
   means for determining an interference level on a resource;
   means for transmitting a signal on the resource with a first power when the interference level is low, the first power being such that the signal is received with a first signal to noise ratio (SNR); and
   means for transmitting the signal on the resource with a second power when the interference level is high, the second power being such that the signal is received with a second SNR less than the first SNR.

13. The apparatus of claim 12, wherein the means for determining the interference level detects whether other links are communicating on the resource, and wherein the signal is transmitted on the resource with the first power when no links are detected as communicating on the resource, and wherein the signal is transmitted on the resource with the second power when links are detected as communicating on the resource.

14. The apparatus of claim 12, wherein the signal is transmitted to a second apparatus in communication with the apparatus, the apparatus further comprising:
 means for receiving a second signal on the resource;
 means for estimating a signal to interference plus noise ratio (SINR) of the signal transmitted to the second apparatus based on the second signal; and
 means for setting the second power of the signal based on the estimated SINR.

15. The apparatus of claim 14, wherein the second signal is received from the second apparatus and includes information on the SINR.

16. The apparatus of claim 14, further comprising means for estimating an energy of the second signal, wherein the means for estimating estimates the SINR based on the estimated energy.

17. The apparatus of claim 12, wherein the means for determining the interference level estimates a signal to inference plus noise ratio (SINR) of the transmitted signal.

18. The apparatus of claim 17, wherein the second SNR is set to a first value when the estimated SINR is determined to be less than a second value.

19. The apparatus of claim 18, wherein a difference between the first value and the second value is less than or equal to 3 db.

20. The apparatus of claim 17, wherein the second SNR is set to a first value when the estimated SINR is determined to be less than a threshold below an SNR required by a highest rate codebook implemented in the apparatus.

21. The apparatus of claim 20, wherein the threshold is 1 dB.

22. The apparatus of claim 12, wherein the second SNR is set to approximately the SINR.

23. A computer program product in a wireless device, comprising:
 a computer-readable medium comprising code for:
  determining an interference level on a resource;
  transmitting a signal on the resource with a first power when the interference level is low, the first power being such that the signal is received with a first signal to noise ratio (SNR); and
  transmitting the signal on the resource with a second power when the interference level is high, the second power being such that the signal is received with a second SNR less than the first SNR.

24. The computer program product of claim 23, wherein the code for determining the interference level detects whether other links are communicating on the resource, and wherein the signal is transmitted on the resource with the first power when no links are detected as communicating on the resource, and wherein the signal is transmitted on the resource with the second power when links are detected as communicating on the resource.

25. The computer program product of claim 23, wherein the signal is transmitted to a second wireless device in communication with said wireless device, wherein the computer-readable medium further comprises code for:
 receiving a second signal on the resource;
 estimating a signal to interference plus noise ratio (SINR) of the signal transmitted to the second wireless device based on the second signal; and
 setting the second power of the signal based on the estimated SINR.

26. The computer program product of claim 25, wherein the second signal is received from the second wireless device and includes information on the SINR.

27. The computer program product of claim 25, wherein the computer-readable medium further comprises code for estimating an energy of the second signal, wherein the code for estimating estimates the SINR based on the estimated energy.

28. The computer program product of claim 23, wherein the code for determining the interference level estimates a signal to inference plus noise ratio (SINR) of the transmitted signal.

29. The computer program product of claim 28, wherein the second SNR is set to a first value when the estimated SINR is determined to be less than a second value.

30. The computer program product of claim 29, wherein a difference between the first value and the second value is less than or equal to 3 db.

31. The computer program product of claim 28, wherein the second SNR is set to a first value when the estimated SINR is determined to be less than a threshold below an SNR required by a highest rate codebook implemented in the wireless device.

32. The computer program product of claim 31, wherein the threshold is 1 dB.

33. The computer program product of claim 23, wherein the second SNR is set to approximately the SINR.

34. An apparatus for wireless communication, comprising:
 a processing system configured to:
  determine an interference level on a resource;
  transmit a signal on the resource with a first power when the interference level is low, the first power being such that the signal is received with a first signal to noise ratio (SNR); and
  transmit the signal on the resource with a second power when the interference level is high, the second power being such that the signal is received with a second SNR less than the first SNR.

35. The apparatus of claim 34, wherein to determine the interference level, the processing system is configured to detect whether other links are communicating on the resource, and wherein the signal is transmitted on the resource with the first power when no links are detected as communicating on the resource, and wherein the signal is transmitted on the resource with the second power when links are detected as communicating on the resource.

36. The apparatus of claim 34, wherein the signal is transmitted to a second apparatus in communication with the apparatus, wherein the processing system is further configured to:
 receive a second signal on the resource;
 estimate a signal to interference plus noise ratio (SINR) of the signal transmitted to the second apparatus based on the second signal; and
 set the second power of the signal based on the estimated SINR.

37. The apparatus of claim 36, wherein the second signal is received from the second apparatus and includes information on the SINR.

38. The apparatus of claim 36, wherein the processing system is further configured to estimate an energy of the second signal, wherein the processing system is configured to estimate the SINR based on the estimated energy.

39. The apparatus of claim 34, wherein to determine the interference level, the processing system is configured to estimate a signal to inference plus noise ratio (SINR) of the transmitted signal.

40. The apparatus of claim 39, wherein the second SNR is set to a first value when the estimated SINR is determined to be less than a second value.

41. The apparatus of claim 40, wherein a difference between the first value and the second value is less than or equal to 3 db.

42. The apparatus of claim 39, wherein the second SNR is set to a first value when the estimated SINR is determined to be less than a threshold below an SNR required by a highest rate codebook implemented in the apparatus.

43. The apparatus of claim 42, wherein the threshold is 1 dB.

44. The apparatus of claim 34, wherein the second SNR is set to approximately the SINR.

\* \* \* \* \*